United States Patent [19]

Sullivan

[11] 3,939,369
[45] Feb. 17, 1976

[54] HOUSING FOR STARTER MOTOR

[75] Inventor: Matthew A. Sullivan, Elkins Park, Pa.

[73] Assignee: Sullivan Products, Inc., Willow Grove, Pa.

[22] Filed: July 17, 1974

[21] Appl. No.: 489,318

[52] U.S. Cl. .................. 310/89; 123/185 D; 310/50
[51] Int. Cl.² .......................................... H02K 5/00
[58] Field of Search ............................. 310/46–48, 310/50, 85, 89; 74/608, 609; 123/185 D, 185 F; 51/170 T, 170 PT, 268

[56] References Cited
UNITED STATES PATENTS

| | | | |
|---|---|---|---|
| 2,475,750 | 7/1949 | McCormick et al. | 123/185 D |
| 3,203,096 | 8/1965 | Beisheim et al. | 310/50 X |
| 3,439,204 | 4/1969 | Ponczek et al. | 310/50 X |

Primary Examiner—Mark O. Budd
Attorney, Agent, or Firm—Seidel, Gonda & Goldhammer

[57] ABSTRACT

A housing is provided for hand-held starter motors, such as those commonly in use for starting model airplanes by imparting a torque to the spinner or nose cone of the airplane. The housing is provided with a guard to protect the hand holding the motor during the starting operation, as well as means for resting the motor on a horizontal surface without rolling. The housing comprises a cylindrical casing and an end plate through which the shaft of the starter motor extends. The end plate has a flange which extends beyond the circumference of the casing for a distance sufficient to prevent the fingers of the hand from sliding past the end plate while holding the motor. Extending from the flange of the end plate generally parallel to and overlying a portion of the outer surface of the casing is a curved protrusion having a surface which approximately fits the curve of the hand between the thumb and forefinger when the hand is holding the motor. A flat edge on one portion of the flange allows the motor to be rested on a horizontal surface without rolling. Preferably, the housing is provided with a strip switch for operating the motor, and a projection from the casing may serve as both a mounting member for the strip switch and a third point for resting the motor on a surface.

15 Claims, 4 Drawing Figures

U.S. Patent  Feb. 17, 1976  3,939,369
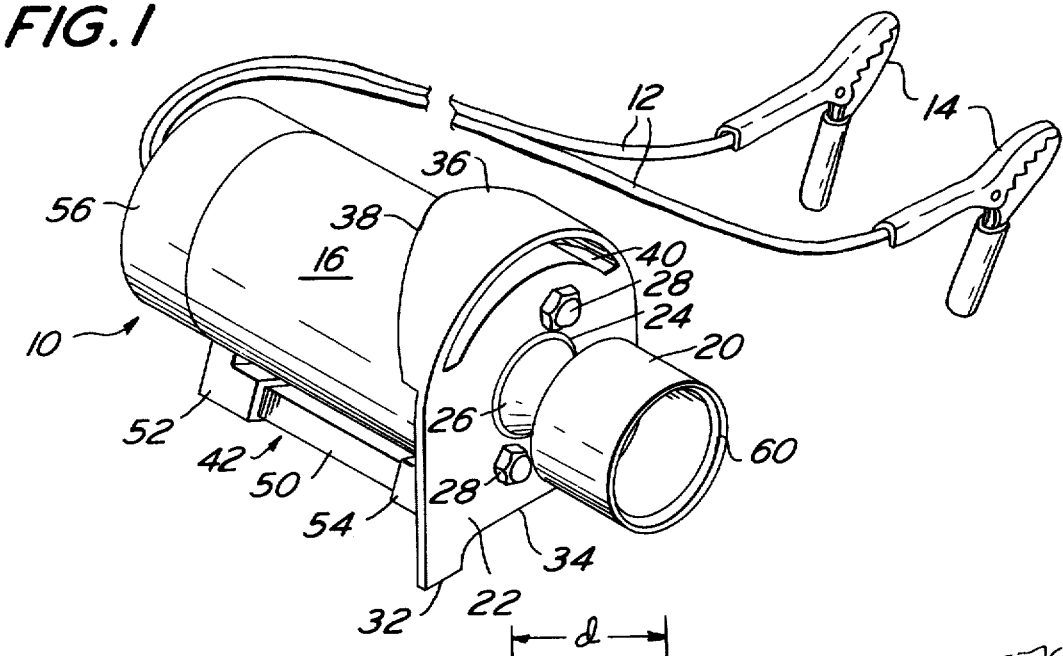
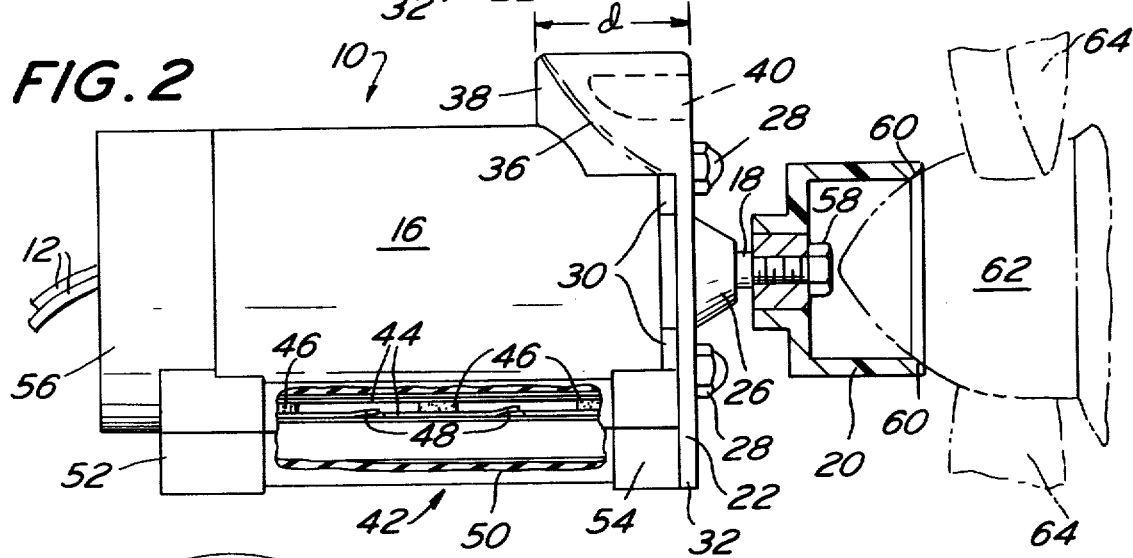
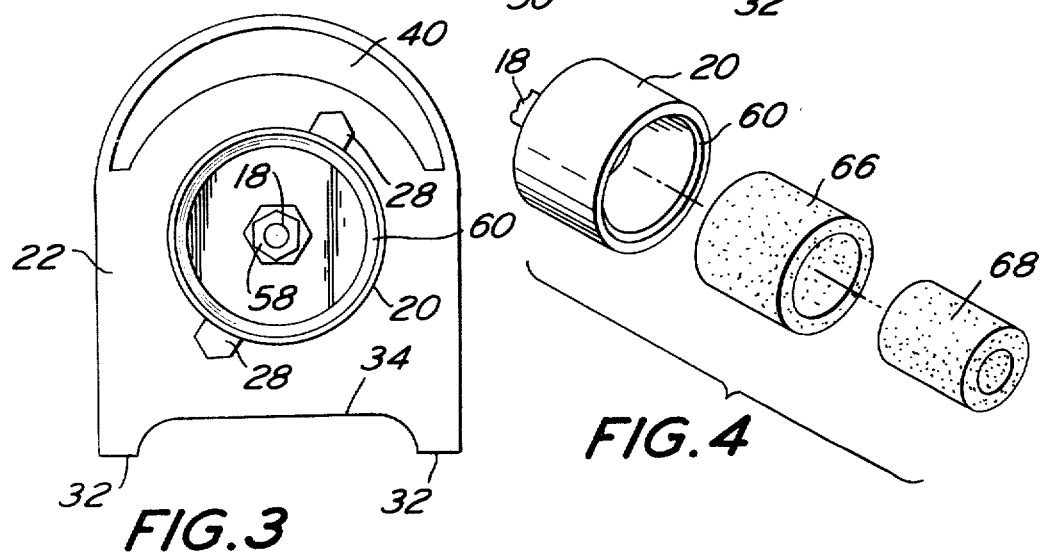

HOUSING FOR STARTER MOTOR

BACKGROUND OF THE INVENTION

The present invention relates to a housing for starter motors. More particularly, the present invention is directed to a safe and stable housing for hand-held starter motors of the type used for starting model airplanes and the like.

For many years the only way of starting a model airplane engine was to flick the propeller of the airplane a number of times with the fingers until the motor started. This procedure was rather dangerous not only because of the possibility of cuts, scratches and splinters when flicking the propeller with the fingers, but also due to the possibility of more severe damage to the fingers if not removed quickly enough from the path of the propeller when the motor finally started.

Eventually, starter motors were developed whereby the fingers were replaced with a motor driven shaft and rotating cup to provide the torque to the airplane engine. Examples of such starter motors are disclosed in U.S. Pat. Nos. 2,457,750 and 2,625,143.

In order to use such starter motors, the model airplanes are provided with conical spinners or nose caps which engage the propeller of the airplane. By placing the cup of the starter motor in frictional engagement with the spinner and rotating the cup by means of the motor shaft, torque is provided to the spinner and in turn the propeller in order to start the airplane engine. The starter motor is usually run by hooking it up to a standard 12 volt storage battery such as those commonly used in automobiles.

Recently, with the tremendous increase in model airplane enthusiasts, there has been a great increase in the use of starter motors, and particularly hand-held starter motors. Generally, these hand-held starter motors comprise simply a small diameter cylindrical motor casing with a frictional cup attached to the motor shaft extending from the casing. The use of these hand-held motors has resulted in a number of accidents and injuries to the hands during the procedure of starting model airplane engines. Thus, due to the vibration of the starter motor, the fingers of the hand holding the motor tend to slip forward toward the area where the motor shaft and frictional cup engage the spinner and propeller of the airplane. Hence, there is a great possibility for serious injury to the fingers either from the motor shaft or the propeller or both. Moreover, due to the cylindrical body of the starter motor casing, the starter motor has a tendency to roll away when placed on the ground after starting the airplane engine. This can result in further injury to the feet of persons standing nearby.

Accordingly, it would be desirable to have a safe starter motor which is simple and inexpensive in construction and would substantially reduce the possibility of injury from such starter motors during the starting of model airplane engines and the like.

BRIEF SUMMARY OF THE INVENTION

The above and other disadvantages of the prior art may be alleviated by the apparatus of the present invention. According to the improved apparatus of the invention a housing for hand-held starter motors is provided comprising a substantially cylindrical casing for the motor, the cylindrical axis of the casing being substantially parallel to the shaft of the motor and the diameter of the casing being such that the hand of the operator may extend around more than half of the circumference of the casing in order to hold the motor, and an end plate for the casing at the end of the motor where the shaft extends from the casing, the end plate being substantially perpendicular to the shaft and having an opening through which the shaft may extend. According to the improvement, the end plate is provided with a flange which extends laterally beyond the circumference of the casing along at least 180° of the circumference, with the lateral extent of the flange beyond the casing being sufficient to prevent the fingers of the hand from sliding past the end plate while holding the motor. In addition, extending from the flange is an arcuate protrusion which extends generally parallel to and overlying a portion of the outer surface of the casing. The circumferential and axial extent of this protrusion remote from the flange is defined by a curved surface which approximately fits the curvature of the hand between the thumb and forefinger when the hand is holding the motor. Suitable means are provided for fastening the casing, motor and end plate firmly together.

Preferably, the flange extends all of the way around the circumference of the casing and has a flat edge for resting the motor on a horizontal surface. Also, in the preferred embodiment, the housing is provided with a strip switch for operating the starter motor. The strip switch is located on generally the same side of the casing as the flat edge of the flange so that the tips of the fingers may operate the switch when the curve of the hand between the thumb and forefinger is fitted against the curved surface of the protrusion.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

FIG. 1 is a perspective view of a starter motor having a housing according to the present invention.

FIG. 2 is a side elevation view, partially in section, of a starter motor having a housing according to the present invention, and shown in operating engagement with a model airplane spinner and propeller (in phantom).

FIG. 3 is an end elevation view showing the end plate of the present invention and the frictional cup for engaging an airplane spinner.

FIG. 4 is an exploded perspective view of a frictional cup for a starter motor, together with inserts for reducing the size of the cup.

DETAILED DESCRIPTION OF THE PREFERRED EMBODIMENT

Referring to the drawings wherein like numbers indicate like elements throughout the figures, there is shown a hand-held starter motor generally indicated as 10. The motor itself is conventional, is disposed in casing 16, and does not per se form any part of the present invention. In general, any small motor whose rotor can provide sufficient torque or rotational force to start a model airplane engine will be satisfactory. Many such motors are commercially available and well known to those of ordinary skill in the art.

The power for the motor may be provided in any suitable manner, such as by battery or house current. Since it is generally desirable to start model airplanes well away from buildings, it is preferred to use a source of battery power. In the embodiment shown, the motor is provided with electrical cables 12 and battery clamps 14 for easy attachment to and detachment from a storage battery (not shown), such as a conventional 12 volt automobile battery. Cables 12 lead to a conventional power supply circuit (not shown) which is associated with the motor and controlled by a switch.

Aside from the requirement that the motor be capable of producing sufficient torque to start a model airplane engine, it is only necessary that the engine be sufficiently small in diameter to be easily held in the hand. That is, the motor should be sufficiently small so that the diameter of the substantially cylindrical casing 16 will be such that the hand of the operator may extend around more than 180° of the circumference of the casing 16 in order to firmly grip and hold the starter motor 10. For example, a suitable casing 16 may have a diameter on the order of about 3 inches and a circumference of about 10 inches.

The casing 16 may be an integral part of the motor as built, or it may comprise a hollow cylindrical tube into which a motor may be inserted and fastened. In either case, the cylindrical axis of the casing will be substantially parallel, and usually concentric, with the rotor or shaft 18 which is driven by the motor, and the shaft 18 will extend beyond the casing, whereby a frictional cup 20 is attached thereto for engagement with the spinner of a model airplane or the like. Up to this point, the hand-held starter motor is entirely conventional and known in the art.

According to the invention, an end plate 22, having special features as described below, is provided for casing 16. The end plate 22 is substantially perpendicular to shaft 18 and the cylindrical axis of casing 16. End plate 22 has a hole 24 through which shaft 18 and bushing 26 extend.

The end plate 22 is fastened to the motor by nuts 28 and bolts (not shown) which may extend from the motor. The casing 16 may also be fastened to the motor and end plate 22 by means of these nuts and bolts or by other means. Alternatively, the end plate 22 may be formed integrally, such as by molding, with casing 16. As shown in the drawings, the end plate 22 is a separate piece and is mounted with a gap 30 between the inner face of the end plate 22 and the end of casing 16. This gap 30 provides ventilation for the motor.

The end plate 22 is of such dimensions or lateral extent that it extends beyond the circumference of the outer surface of casing 16 a substantial distance. In effect, this lateral extension of end plate 22 forms a flange around the end of casing 16. The lateral extent of this flange should be sufficient to prevent the fingers of the hand from sliding past the end plate 22 when the hand is wrapped around casing 16 to hold the starter motor. A flange width (i.e., the distance from the outer surface of the casing to the outer edge of end plate 22) of about ¾ inch to 1 inch should generally be sufficient, although greater widths may be used.

In the preferred embodiment shown in the drawings, the end plate 22 extends beyond the outer circumference of casing 16 on all sides (i.e., around 360° of the circumference). However, one of ordinary skill in the art will readily understand that it is only essential that the flange extend along at least 180° of the circumference of the casing. Thus, in order to firmly hold the starter motor, it is only necessary that the hand extend somewhat more than 180° around the circumference of the casing 16. Accordingly, the flange which serves to protect the fingers and thumb of the hand need only extend around this same portion of the casing where the thumb and fingers will lie.

As shown in FIGS. 1 and 3, the end plate 22 of the preferred embodiment has a semi-circular top portion and a rectangular bottom portion with cut-out 34. This provides the end plate 22 with flat edges 32 on which the starter motor 10 may rest when placed on a horizontal surface. Although the imaginary line joining flat edges 32 may be tangent to the outer circumference of casing 16, it is preferred that this line be spaced beyond the outer circumference of casing 16 in order to provide sufficient space for the strip switch, which will be described more fully below.

It will be understood to those of ordinary skill in the art that the bottom edge of end plate 22 need not be cut-out as at 34, but may have a number of different shapes, as long as the edge is not convex. The purpose of the flat edges 32 is to prevent or resist rolling of the starter motor 10 when the starter motor 10 is placed on a horizontal surface. Hence, the bottom edge may have any shape which will provide two relatively widely spaced fulcrum points to provide stability to the starter motor 10 when placed on a surface. For example, if desired, flat edges 32 may extend all the way across the bottom of end plate 22 (i.e., without cut-out 34). As will be described more fully below, additional stability may be provided to the starter motor, by providing a third fulcrum point at the opposite end of casing 16.

From the top semi-circular portion of the end plate 22 extends an arcuate protrusion 36. This protrusion 36 extends rearwardly from the flange formed by end plate 22, and extends generally parallel to and overlying a portion of the outer surface of casing 16. The extent of the protrusion 36 remote from end plate 22 in the axial and circumferential directions (with respect to casing 16) is defined by a curved surface 38. This curved surface 38 is of such a shape that it will approximately fit the curvature of the hand between the thumb and forefinger when the hand is holding the starter motor. As a result, the hand will be forced to grip or hold the starter motor at a distance from the end plate 22 to minimize the danger of accident and injury to the fingers and hand from the moving parts in front of end plate 22.

The axial extent or distance $d$ of the protrusion 36 is not critical and may be as long as desired, but sufficient room should be left behind curved surface 38 for the hand to grip casing 16. A suitable dimension for distance $d$ may be on the order of about 2 inches. Protrusion 36 may be molded integrally with end plate 22 or formed as a separate piece and bolted or otherwise fastened to end plate 22 and/or casing 16. If desired, protrusion 36 may be hollow as shown at 40 in FIGS. 1 and 3, in order to save weight and material.

The switch for operating the motor of starter motor 10 may be placed in any convenient position. However, in the preferred embodiment shown in the drawings, the starter motor 10 is provided with a strip switch, designated generally as 42. Strip switches, also referred to as linear switches, are quite well known and readily available commercially. Examples of such strip or linear switches are shown in U.S. Pat. Nos. 3,111,185; 3,732,384 and 1,915,292.

The particular construction of the strip switch 42 per se forms no part of the present invention. However, basically the strip switch shown comprises two elongated metal strips 44, made of strips of copper or other electrically conductive material, spaced apart by resilient pads 46, which may be made of sponge rubber. One or both of the metal strips is provided with struck-out portions 48 intermediate resilient pads 46. The metal strips 44 and resilient pads 46 are encased in a resilient cover 50, which may suitably be made of rubber, to complete the strip switch. These details of the strip switch 42 are shown best in the broken away sectional view of FIG. 2.

Wires (not shown) lead from either end of the strip switch to the motor. The wires may pass through either mounting member 52 or 54 (preferably 52) for the strip switch. The motor is then operated simply by pressing with the fingers on the resilient cover 50 of strip switch 42. This pressure forces the struck-out portions 48 to form contacts between the two metal strips 44 to complete the circuit which supplies power to the motor. Release of the pressure with the fingers allows resilient pads 46 to force the metal strips 44 apart, thereby breaking the circuit and discontinuing operation of the motor. This provides a further safety feature in that the starter motor cannot be left running when it is released from the hand and placed on a surface.

As shown in the drawings, the strip switch is preferably located toward the bottom of casing 16; that is, on a portion of casing 16 remote from protrusion 36. As shown, strip switch 42 extends generally parallel to the cylindrical axis of casing 16. In this position, the tips of one or more of the fingers of the hand will overlie strip switch 42 when the starter motor is held in the hand so that the curvature of the hand between the thumb and forefinger fits against curved surface 38. This allows easy and comfortable operation of the starter motor.

It will be noted that in the embodiment shown in the drawings, strip switch 42 is located for ease of operation by the fingers of the right hand. However, it will be understood that strip switch 42 could be located slightly to the other side of the bottom of casing 16 for operation by the left hand. Alternatively, if the circumference of casing 16 is sufficiently small, strip switch 42 may be located exactly on the bottom of casing 16 for operation by the fingers of either hand.

The strip switch 42 may be mounted on the starting motor 10 by mounting members 52 and 54. The mounting members 52 and 54 may simply comprise blocks having hollowed out portions or recesses into which the ends of strip switch 42 will fit. At least one of the mounting members, preferably mounting member 52, should be completely hollow to allow passage of lead wires from the strip switch 42 to the power supply circuit for the motor. As shown, mounting member 52 extends from casing 16 approximately the same distance as flat edges 32 of end plate 22. As a result, the bottom edge, corner or surface of mounting block 52 provides a third resting point or fulcrum, along with the flat edges 32 of end plate 22, thereby providing a stable tripod-like resting stand for the starter motor when it is placed on a horizontal surface.

Mounting members 52 and 54 may be attached directly to casing 16, if desired. Alternatively, as shown in the drawings, mounting member 52 may be attached or formed integrally with a separable end cap portion 56 of casing 16. Similarly, the second mounting member 54 may be attached to or formed integrally with end plate 22.

The various portions of the housing (including casing 16, end plate 22, protrusion 36, and mounting members 52 and 54) for the starter motor 10 may be made of any suitable desired materials. Preferably, the pieces are molded from a hard, impact resistant plastic, such as polystyrene or any of a number of other thermoplastic or thermosetting polymers which may or may not be reinforced, such as with glass fibers.

The starter motor 10 is shown in operation in FIG. 2 of the drawings. A frictional cup 20 is attached to shaft 18 by a suitable lock nut arrangement 58. The beveled edges 60 of the cylindrical cup 20 are then placed in frictional engagement with the spinner or nose cap 62 of a model airplane, as shown in phantom in FIG. 2. The spinner 62 in turn engages the blades 64 of the propeller of the airplane.

In FIG. 4 there are shown cylindrical inserts 66 and 68 of decreasing diameter. These inserts may be telescoped into frictional cup 20 for use in engaging spinners or nose caps 62 of smaller diameter. These inserts 66 and 68 may be formed of any suitable high friction material, such as rubber or the like, which will provide a satisfactory frictional engagement with both the spinner and the inside of frictional cup 20. Suitable inserts are made of natural latex rubber, and the diameters are such that a close frictional fit is provided between the surfaces of cup 20 and inserts 66 and 68.

Although the apparatus of the present invention has been described with particular reference to starter motors for model airplanes, it will be understood that the starter motor 10 could be used to start other equipment such as lawn mower engines and the like. Also, the casing 16, end plate 22, protrusion 36 and mounting members 52 and 54 could be used for other hand-held power tools besides starter motors, as will be evident from the above description.

The present invention may be embodied in other specific forms without departing from the spirit or essential attributes thereof and, accordingly, reference should be made to the appended claims, rather than to the foregoing specification as indicating the scope of the invention.

I claim:

1. In an apparatus for housing a hand-held starter motor comprising an electric motor, a substantially cylindrical casing for said motor, the cylindrical axis of said casing being substantially parallel to a shaft connected to said motor and extending from the casing, and the diameter of said casing being such that the hand may extend around more than 180° of the circumference of said casing to hold said motor, the improvement comprising flange means adjacent the end of said casing where said shaft extends from said casing, said flange means extending radially outwardly beyond the circumference of said casing along substantially 360° of said circumference, the radial extent of said flange means being sufficient to prevent the user's hand and fingers from sliding past said flange means, said flange means having a curved surface, said curved surface circumscribing a portion of the outer surface of said casing and facing away from the end of said casing from which said shaft extends, said curved surface approximately fitting the curve of the hand between the thumb and the forefinger when the hand is holding said motor.

2. Apparatus according to claim 1 wherein a portion of said flange means is provided with two spaced fulcrum points, whereby said motor will resist rolling when said motor is placed on a substantially horizontal surface.

3. Apparatus according to claim 1 wherein said casing is provided on the outer surface thereof with a switch for operating said motor.

4. Apparatus according to claim 3 wherein said switch is a strip switch.

5. Apparatus according to claim 4 wherein said strip switch extends substantially parallel to the cylindrical axis of said casing.

6. Apparatus according to claim 1 wherein a strip switch is located on a portion of the casing remote from said curved surface, such that the tips of one or more fingers of the hand may overlie and operate said strip switch when the hand is holding said motor and said curved surface is fitted against the curve of the hand between the thumb and forefinger.

7. Apparatus according to claim 2 wherein said casing has a projection extending from the outer surface thereof, said projection being located adjacent the end of said casing remote from said flange means and being on generally the same side of the casing as the fulcrum points of said flange means, whereby said projection and said fulcrum points provide a stand for resting said motor on a horizontal surface.

8. Apparatus according to claim 7 wherein said projection comprises a mounting member for one end of a strip switch for operating said motor.

9. Apparatus according to claim 8 wherein a second mounting member for the other end of said strip switch extends from said flange means adjacent said fulcrum points.

10. Apparatus according to claim 7 wherein the end of said casing remote from said end plate comprises a cylindrical end cap, said end cap being separable from the remainder of said casing, and said projection extending from the outer surface of said end cap.

11. Apparatus according to claim 1 wherein said casing and said flange means are made of hard, impact resistant plastic.

12. Apparatus according to claim 1 wherein said shaft is provided on the end extending from said casing with a cup-shaped member suitable for frictionally engaging the spinner of a model airplane.

13. Apparatus according to claim 12 wherein said cup-shaped member is provided with rubber-like, hollow, cylindrical inserts of decreasing diameter, whereby said cup-shaped member may be adapted for engaging spinners of smaller diameter.

14. Apparatus according to claim 2 wherein said fulcrum points are defined by a flat edge on said flange means.

15. In an apparatus for housing a hand-held starter motor comprising an electric motor, a substantially cylindrical casing for said motor, the cylindrical axis of said casing being substantially parallel to a shaft connected to said motor and extending from the casing, and the diameter of said casing being such that the hand may extend around more than 180° of the circumference of said casing to hold said motor, the improvement comprising flange means adjacent the end of said casing where said shaft extends from said casing, said flange means extending radially outwardly beyond the circumference of said casing along substantially 360° of said circumference, the radial extent of said flange means being sufficient to prevent a user's fingers and hand from sliding past said flange means, said flange means being provided with two spaced fulcrum points to resist rolling of the starting motor when placed on a substantially horizontal surface, said casing having a projection extending from the outer surface thereof and located adjacent the end of said casing remote from said flange means and being on generally the same side of the casing as said fulcrum points, said projection comprising a mounting member for one end of a strip switch for operating said motor, and a second mounting member for the other end of said strip switch extending from said flange means adjacent said fulcrum points.

* * * * *